United States Patent
Cho et al.

(10) Patent No.: US 9,994,928 B2
(45) Date of Patent: Jun. 12, 2018

(54) METHOD FOR RECYCLING IRON-CONTAINING BY-PRODUCTS DISCHARGED FROM COAL-BASED MOLTEN IRONMAKING PROCESS, SYSTEM THEREFOR, AND REDUCED IRON AGGLOMERATION SYSTEM

(71) Applicant: POSCO, Pohang-si (KR)

(72) Inventors: Min-Young Cho, Pohang-si (KR); Hyun-Soo Kim, Pohang-si (KR); Dal-Hoi Lee, Pohang-si (KR); Jong-Yeol Lee, Pohang-si (KR); Shi-Kyung Yoon, Pohang-si (KR); Moo-Eob Choi, Pohang-si (KR); Chang-Kuk Ko, Pohang-si (KR)

(73) Assignee: POSCO, Pohang-si (KR)

( * ) Notice: Subject to any disclaimer, the term of this patent is extended or adjusted under 35 U.S.C. 154(b) by 210 days.

(21) Appl. No.: 14/773,848

(22) PCT Filed: Mar. 26, 2014

(86) PCT No.: PCT/KR2014/002567
§ 371 (c)(1),
(2) Date: Sep. 9, 2015

(87) PCT Pub. No.: WO2014/157949
PCT Pub. Date: Oct. 2, 2014

(65) Prior Publication Data
US 2016/0024611 A1    Jan. 28, 2016

(30) Foreign Application Priority Data

Mar. 26, 2013 (KR) .................. 10-2013-0032409
Mar. 25, 2014 (KR) .................. 10-2014-0034562

(Continued)

(51) Int. Cl.
C22B 1/16    (2006.01)
C22B 7/02    (2006.01)
(Continued)

(52) U.S. Cl.
CPC .............. C22B 1/16 (2013.01); C21B 13/004 (2013.01); C21B 13/0033 (2013.01);
(Continued)

(58) Field of Classification Search
CPC ... C21B 13/0033; C21B 2200/00; C22B 1/16; C22B 7/02
See application file for complete search history.

(56) References Cited

U.S. PATENT DOCUMENTS 3,097,945 A * 7/1963 Paris ........................ C22B 1/24
                                                                75/436
2001/0047698 A1* 12/2001 McClelland, Jr. ........ C22B 1/24
                                                                75/436
(Continued)

FOREIGN PATENT DOCUMENTS

CN    1509339    6/2004
CN    101466853    6/2009
(Continued)

OTHER PUBLICATIONS

Bae Woo Hyeon et al. KR 20060023212 published Mar. 2006, Machine translation.*
(Continued)

Primary Examiner — George Wyszomierski
Assistant Examiner — Tima M McGuthry Banks
(74) Attorney, Agent, or Firm — Cantor Colburn LLP

(57) ABSTRACT

There is provided a method and system for recycling by-products containing large amounts of useful components and discharged in the form of dust and sludge from a coal-based molten iron making process to reuse the by-products in a
(Continued)

reduced iron agglomeration process. The system includes: a fluidized reduction furnace reducing fine iron ore; a reduced iron tank connected to the fluidized reduction furnace through a reduced iron discharge pipe for storing the reduced iron and supplying the reduced iron in an agglomeration system; an agglomeration system agglomerating the reduced iron transferred from the reduced iron tank; and a transfer unit transferring compactions of by-products discharged from a molten iron making process through a by-product supply pipe. The compactions of the by-products are supplied to at least one selected from the group consisting of the fluidized reduction furnace, the reduced iron supply pipe, and the reduced iron tank.

11 Claims, 6 Drawing Sheets

(30) Foreign Application Priority Data

Mar. 25, 2014 (KR) .................. 10-2014-0034563
Mar. 25, 2014 (KR) .................. 10-2014-0034564

(51) Int. Cl.
  *C21B 13/00* (2006.01)
  *C22B 1/242* (2006.01)
(52) U.S. Cl.
  CPC ............ *C22B 1/242* (2013.01); *C22B 7/02* (2013.01); *Y02P 10/216* (2015.11)

(56) References Cited

U.S. PATENT DOCUMENTS

| 2001/0054329 | A1* | 12/2001 | Hoffman | C21B 13/10 |
| | | | | 75/386 |
| 2011/0179910 | A1 | 7/2011 | Boehm et al. | |
| 2013/0032005 | A1* | 2/2013 | Boehm | C21B 13/00 |
| | | | | 75/319 |

FOREIGN PATENT DOCUMENTS

| CN | 102618718 A | * | 8/2012 |
| JP | 09143578 | | 6/1997 |
| JP | 10140221 | | 5/1998 |
| JP | 2012207241 | | 10/2012 |
| KR | 1020000039376 | | 7/2000 |
| KR | 1020020049889 | | 6/2002 |
| KR | 1020030052345 | | 6/2003 |
| KR | 1020030053645 | | 7/2003 |
| KR | 1020030055026 | | 7/2003 |
| KR | 20060023212 A | * | 3/2006 |
| KR | 100797839 | | 1/2008 |
| KR | 20090064785 | | 6/2009 |
| KR | 1020090066683 | | 6/2009 |
| WO | 03056039 | | 7/2003 |
| WO | 2009078662 | | 6/2009 |

OTHER PUBLICATIONS

Lin Wang et al. CN 102618718 A published Aug. 2012, Machine translation.*
European Search Report—European Application No. 14776345.2, dated Apr. 14, 2016, citing US 2011/179910, WO 03/056039, WO 2009/078662, US 2013/032005, KR 2000 0039376 and KR 100 797 839.
Chinese Office Action—Chinese Application No. 201480018523.7 dated May 27, 2016, citing KR10-0797839, CN1509339, KR 2000-0039376, CN101466853 and JP 10-140221.
Korean Office Action—Korean Application No. 10-2016-0087704 dated Jul. 28, 2016, citing KR 10-0797839 and KR 10-2003-0055026.
Korean Office Action—Korean Application No. 10-2014-0034564 dated Dec. 1, 2015, citing KR 10-2000-0039376, KR 10-0797839 and KR 10-2009-0064785.
International Search Report—PCT/KR2014/002567 dated Jun. 26, 2014.

* cited by examiner

METHOD FOR RECYCLING IRON-CONTAINING BY-PRODUCTS DISCHARGED FROM COAL-BASED MOLTEN IRONMAKING PROCESS, SYSTEM THEREFOR, AND REDUCED IRON AGGLOMERATION SYSTEM

TECHNICAL FIELD

The present disclosure relates to a method and system for effectively agglomerating by-products containing useful materials such as iron and discharged in the form of dust and sludge from a coal-based molten iron making process so as to reuse the by-products in a reduced iron agglomeration process.

In addition, the present disclosure relates to a method for recycling agglomerated by-products, and more particularly, to a method and system for recycling by-products in a reduced iron agglomeration process.

BACKGROUND ART

A FINEX method, a coal-based molten iron making method, includes a fluidized reduction process for reducing fine iron ore, an agglomeration process for agglomerating the reduced fine iron ore, and a melting furnace process for melting the agglomerated and reduced iron ore in a melting furnace including a coal filling layer. Certain amounts of by-products are discharged from each of the processes.

The by-products include large amounts of materials usable in a molten iron making process, such as iron ore, supplementary materials, and carbon-containing materials, and it is economically desirable to recycle the by-products in a molten iron making process. The by-products may be collected in the form of sludge by using water or in the form of dust without using water.

However, it is not easy to handle by-products collected in the form of sludge because of moisture contained in the by-products, and a pretreatment process is necessary before recycling the by-products. That is, it is necessary to remove moisture from sludge-type by-products to some degree before recycling the sludge-type by-products, and this requires a large amount of energy.

In addition, since such by-products have a significantly small particle size, on the level of 100 µm or less, if the by-products are directly used in a molten iron making process, most of the by-products may be blown off. Therefore, because of such problems, by-products are agglomerated and then recycled in a melting furnace process.

When by-products are recycled in a melting furnace process, dust-type by-products are agglomerated and then inserted into a melting furnace, and sludge-type by-products are dried, agglomerated, and then inserted into a melting furnace. However, since agglomerated by-products have a low degree of room-temperature strength and a low degree of high-temperature strength (hot strength), the agglomerated by-products are easily broken during transfer or at the moment the agglomerated by-products are inserted into a melting furnace having a temperature of about 1,000° C. Particles broken from the agglomerated by-products may be blown by a reducing gas of the melting furnace and may be discharged in the form of dust or sludge, thereby decreasing the efficiency of recycling. In addition, if particles broken from the agglomerated by-products remain in the melting furnace, the particles may fill pores of large particles, and thus the permeability of the large particles may be decreased.

To address these problems, binders are used to improve the coupling strength of particles, or a high-temperature heat treatment is performed as in a pelletizing process. In this case, however, energy consumption and manufacturing costs are increased, and the effects of recycling are lowered.

Because of the above-mentioned problems, by-products are limitedly reused in molten iron making FINEX systems, and thus most collected by-products are provided to cement plants requiring iron sources free of charge or are buried underground. Therefore, technology for recycling by-products using a minimum amount of energy while preventing breakage of agglomerated by-products is required.

DISCLOSURE

Technical Problem

An aspect of the present disclosure may provide a method and system for agglomerating by-products discharged from a molten iron making process in the form of sludge and dust so as to recycle the by-products.

An aspect of the present disclosure may also provide a method and system for effectively recycling by-products discharged in the form of sludge and dust by agglomerating the by-products, mixing the agglomerated by-products with reduced iron, and agglomerating the reduced iron mixed with the agglomerated by-products.

Technical Solution

According to an aspect of the present disclosure, there may be provided a method for recycling iron-containing by-products discharged from a molten iron making process in the form of dust and sludge containing moisture, the method including: agglomerating the by-products discharged from the molten iron making process to form by-product compactions; and forming reduced iron compactions by mixing reduced iron with the by-product compactions and agglomerating the reduced iron mixed with the by-product compactions.

The agglomerating of the by-products may include: drying a portion or all of the sludge; preparing a by-product mixture having a predetermined moisture content by mixing the dried sludge with the dust or with the dust and remaining sludge; agglomerating the by-product mixture to form agglomerated by-products; and drying the agglomerated by-products to form by-product compactions.

The drying of the portion or all of the sludge may include adding the dust to the portion or all of the sludge. The by-product mixture may have a moisture content of 30 wt % or less.

The agglomerating may be performed by an agitating and mixing method, a pelletizing method, a briquetting method, or an extruding method, and the agitating and mixing method may be performed at a speed of 200 rpm to 600 rmp for 30 minutes.

The by-product compactions may have a moisture content of 5 wt % or less.

The drying of the agglomerated by-products may be performed by a static drying method using a belt drier or a grate dryer.

The by-product compactions may have an average particle size of 1 mm to 10 mm.

After the drying of the agglomerated by-products, the method may further include sorting the by-product compactions to separate by-product compactions having a particle size of 1 mm to 10 mm, and the by-product compactions may have a strength of 0.5 kgf or greater when having a particle size of 5 mm.

In the forming of the reduced iron compactions, the by-product compactions and the reduced iron may be mixed at a weight ratio greater than 0:10 but equal to or less than 9:1.

The reduced iron may be obtained by reducing iron ore in a reduction furnace under a reducing atmosphere.

The forming of the reduced iron compactions may include: reducing iron ore in a fluidized reduction furnace under a reducing atmosphere so as to form reduced iron; discharging the reduced iron through a reduction furnace discharge pipe; storing the reduced iron in a reduced iron tank; supplying the reduced iron from the reduced iron tank to a forceful transfer tank through a reduced iron supply pipe; and supplying the reduced iron to an agglomeration device to agglomerate the reduced iron, wherein the by-product compactions may be supplied to one or more of the above-listed operations and mixed with the reduced iron.

The by-product compactions may be transferred using carrier gas, gravity, or a mechanical transfer unit, and the method may further include mixing the reduced iron with the by-product compactions by supplying the by-product compactions to one or more of the fluidized reduction furnace, the reduction furnace discharge pipe, and the reduced iron tank.

In another example, the method may further include mixing the reduced iron with the by-product compactions by supplying the by-product compactions to one or both of the reduced iron supply pipe and the forceful transfer tank. In this case, the by-product compactions may be transferred by a flow of carrier gas and supplied to the one or both of the reduced iron supply pipe and the forceful transfer tank after the carrier gas is removed from the by-product compactions by a gas-solid separation method.

According to another aspect of the present disclosure, there may be provided a system for agglomerating iron-containing by-products discharged from a molten iron making process in the form of dust and sludge containing moisture, the system including: a sludge dryer receiving the sludge through a pipe and drying the sludge; a by-product agglomeration device receiving the dust and the sludge dried by the sludge dryer respectively through pipes and mixing and agglomerating the dust and sludge to form agglomerated by-products; and a compaction dryer receiving the agglomerated by-products from the by-product agglomeration device and removing moisture from the agglomerated by-products to form by-product compactions.

The sludge dryer may include an additional pipe to receive the dust and mix and dry the sludge and the dust.

The by-product agglomeration device may be an agitating device, a briquetting device, a pelletizer, or an extruder, and the by-product agglomeration device may include an additional pipe through which the sludge containing moisture is supplied.

The compaction dryer may be a belt dryer or a grate dryer.

The system may further include a classifier sorting the by-product compactions according to particle sizes of the by-product compactions and returning fine or coarse by-product compactions to the by-product agglomeration device through a pipe.

According to another aspect of the present disclosure, there may be provided a system for agglomerating reduced iron obtained by reducing fine iron ore in a molten iron making process, the system including: a fluidized reduction furnace reducing iron ore to produce reduced iron; a reduced iron tank connected to the fluidized reduction furnace through a reduction furnace discharge pipe and storing the reduced iron discharged from the fluidized reduction furnace; a forceful transfer tank connected to the reduced iron tank through a reduced iron supply pipe and supplying the reduced iron from the reduced iron tank to an agglomeration device; a reduced iron agglomeration device agglomerating the reduced iron supplied from the forceful transfer tank; and a by-product supply pipe through which by-product compactions produced by agglomerating by-products discharged from a molten iron making process are transferred to the reduced iron agglomeration device.

The by-product supply pipe may be connected to at least one selected from the group consisting of the fluidized reduction furnace, the reduction furnace discharge pipe, and the reduced iron tank. In another example, the by-product supply pipe may be connected to at least one selected from the group consisting of the reduced iron supply pipe and the forceful transfer tank.

The system may further include a transfer unit transferring the by-product compactions by using a flow of carrier gas, gravity, or a mechanical device.

The system may further include: a transfer unit transferring the by-product compactions by a flow of carrier gas; and a gas compressor generating the flow of carrier gas.

The system may further include: a transfer unit transferring the by-product compactions by a flow of carrier gas; and a gas-solid separator separating the carrier gas from the by-product compactions by a gas-solid separation method and then supplying the by-product compactions to the by-product supply pipe. In this case, the gas-solid separator may be a cyclone separator.

The system may further include a transfer unit transferring the by-product compactions, wherein the transfer unit may be a bucket elevator or a conveyer belt.

Advantageous Effects

According to exemplary embodiments of the present disclosure, by-products discharged in the form of sludge and dust from a molten iron making process such as a FINEX process may be efficiently agglomerated according to factors such as the amounts, particle characteristics, and moisture contents of the sludge and dust.

In addition, according to exemplary embodiments, sludge and dust, by-products discharged from a molten iron making process, are mixed with each other and agglomerated with reduced iron. Thus, the moisture content of the sludge may be controlled when the sludge is recycled, and problems such as the loss and permeability reduction of by-products caused by breakage of by-product compactions may not occur when by-products are agglomerated into compactions and recycled.

In addition, according to other exemplary embodiments of the present disclosure, by-products discharged from a molten iron making process in the form of sludge and dust are agglomerated as by-product compactions and then mixed with reduced iron and agglomerated. Therefore, breakage of the by-product compactions may be prevented when by-products are recycled.

Consequently, the loss of by-products may be prevented, and the permeability of by-products may not be lowered when the by-products are processed in a melting furnace.

BEST MODE

Figure 1:
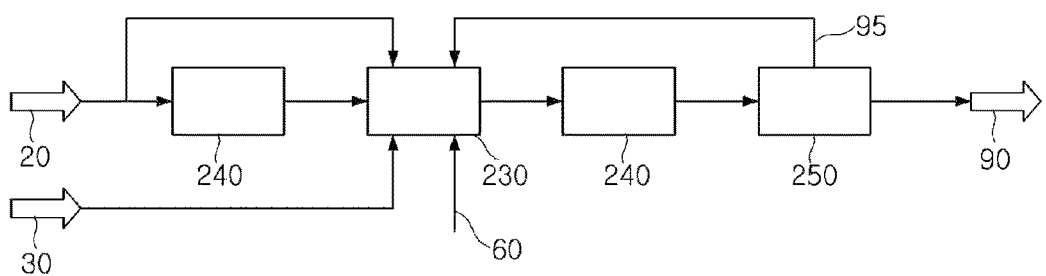
FIG. 1 is a process diagram illustrating an exemplary process for agglomerating by-products discharged in the form of sludge and dust from a molten iron making process.

Hereinafter, exemplary embodiments will be described in detail with reference to the accompanying drawings. The disclosure may, however, be exemplified in many different forms and should not be construed as being limited to the specific embodiments set forth herein. In the accompanying drawings in which exemplary embodiments are illustrated, at least some elements or regions may be illustrated on an enlarged or reduced scale.

Generally, by-products of molten iron making processes include materials such as iron ore, supplementary materials, and carbon-containing materials that are usable in molten iron making processes. Therefore, such by-products may be reused in molten iron making processes. In the related art, such by-products are recycled by a method of agglomerating the by-products into compactions and supplying the compactions to a melting furnace process. However, since the room-temperature strength and high-temperature strength (hot strength) of the compactions are low, the compactions are broken into fine particles while being transferred or at the time the compactions are inserted into a melting furnace, thereby causing problems such as floating dust, sludge loss, or a decrease of the permeability of the compactions.

Thus, the inventors have repeatedly conducted research into methods of efficiently recycling by-products discharged from molten iron making processes and have found that if by-products discharged in the form of sludge and dust from a molten iron making process are agglomerated and mixed with reduced iron to form reduced iron compactions, the by-products may be efficiently recycled without problems such as sludge loss or a decrease of the permeability of the by-products caused by floating of the by-products during a recycling process.

An exemplary embodiment of the present disclosure provides a method of recycling by-products discharged from a coal-based molten iron making process. In detail, the method includes: forming pellets by agglomerating by-products discharged from a molten iron making process; and mixing the pellets with reduced iron and agglomerating the mixture.

According to the present disclosure, by-products discharged in the form of sludge and dust from a coal-based molten iron making process such as a FINEX process may be recycled. For example, sludge and dust discharged from a FINEX process may have the following compositions and average particle sizes shown in Table 1.

TABLE 1

| | Properties | Sludge | Dust |
|---|---|---|---|
| Content (wt %) | Total Fe | 53.6 | 63.2 |
| | Metal Fe + Fe oxides | 74.8 | 83.0 |
| | C | 8.4 | 2.1 |
| | CaO | 3.9 | 5.1 |
| | MgO | 0.7 | 1.4 |
| | Balance | 12.2 | 8.4 |
| Average Particle Size (μm) | | 6.5 | 8.2 |

After about 33 wt % moisture is removed from sludge, the contents of solid components in the sludge are shown.
The content of metal Fe and Fe oxides includes the content of total Fe.
The balance refers to compounds of trace elements.

Referring to Table 1, the sludge and dust include components such as iron oxides, carbon-containing chars, and supplementary materials such as low-quality iron ores to which carbon and supplementary materials are added. That is, the sludge and dust include materials that may be sufficiently reused in the FINEX process.

In addition, the by-products discharged from the FINEX process have an average particle size of about 10 μm or less (90% or more of the by-products by weight have a particle size of 30 μm or less), and the main components of the by-products are iron oxides, coal chars, and oxides or carbides of calcium (Ca) and magnesium (Mg).

If the by-products are agglomerated and then recycled, dust may not float during transfer of the by-products, thereby preventing a decrease of the processability of the by-products and the loss of the by-products. The by-products discharged from the FINEX process may easily be agglomerated because the by-products have the above-described particle size range and component contents, and may easily be recycled because the by-products do not undergo rapid physicochemical reactions at high temperatures.

It is known that if such fine by-products are mixed with reduced iron and agglomerated, the fine by-products are not easily agglomerated because of the reduced iron. Therefore, according to the present disclosure, by-products are mixed with reduced iron after the by-products are agglomerated. In this case, sludge or dust may be agglomerated and then mixed with reduced iron. However, if sludge and dust are mixed with each other and then agglomerated and the agglomerated mixture of sludge and dust is reduced iron, agglomeration may be more easily performed.

The ratio of sludge and dust discharged from FINEX processes is generally about 8:2 to about 7:3. That is, sludge is generated in larger amounts than dust. In addition, the content of moisture in sludge varies within the range of about 25 wt % to 50 wt % according to the discharged position of the sludge and the composition of the sludge. Generally, water is added to dust so as to prevent the dust from floating when the dust is discharged, and thus the moisture content of dust is 15 wt % or less.

Figure 2:
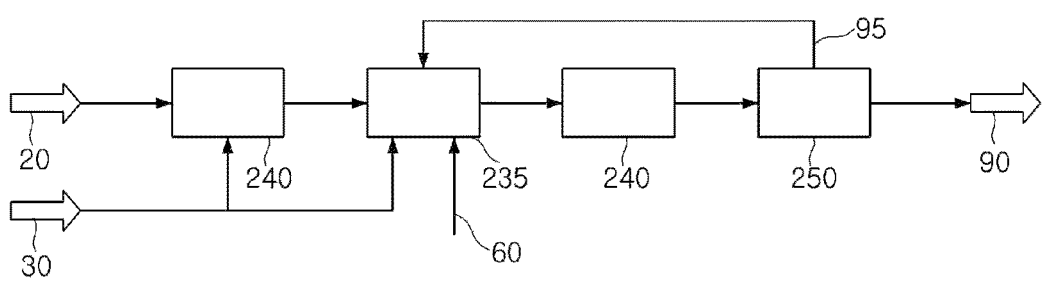
FIG. 2 is a process diagram illustrating another exemplary process for agglomerating by-products discharged in the form of sludge and dust from a molten iron making process.

Such sludge and dust may be agglomerated and then recycled as described above. Referring to FIGS. 1 and 2, by-products may be agglomerated through a sludge drying process, a by-product mixing process, an agglomeration process, and a compaction drying process.

According to the present disclosure, by-products discharged from a molten iron making process in the form of sludge and dust are agglomerated. As shown in Table 1, sludge and dust discharged from FINEX processes include components such as iron oxides, carbon-containing chars, and supplementary materials. Since the content of iron and the content of carbon are 53.6% and 63.2%, respectively, materials sufficiently reusable in FINEX processes may be obtained from the by-products. Therefore, the mix ratio of such by-products is not particularly limited but may be appropriately determined. For example, if equal weights of sludge and dust are mixed together, the total content of iron is about 55 wt % or greater, and the total content of carbon is about 4 wt %. Thus, the mixture of sludge and dust may be suitably recycled.

The by-products may be agglomerated by drying a portion or all of the sludge; preparing a by-product mixture having a predetermined moisture content by mixing the dried sludge with the dust or with the dust and remaining sludge; agglomerating the by-product mixture to form agglomerated by-products; and drying the agglomerated by-products to form by-product compactions.

In this case, the sludge and dust may be agglomerated by mixing the sludge and the dust and mechanically processing the mixed sludge and dust. According to the present disclosure, agglomeration may be performed using a by-product agglomeration device, and non-limiting examples of the by-product agglomeration device include an agitation mixer such as an Eirich mixer, a pelletizer, a briquetting device, or an extruder.

Although the moisture content in the by-product mixture is varied according to a mechanical agglomeration method used to agglomerate the by-product mixture, it may be preferable that the moisture content in the by-product mixture be within the range of 30 wt % or less.

The moisture content of the by-product mixture may be adjusted by various methods. For example, since the sludge and the dust have different moisture contents, the moisture content in the by-product mixture may be adjusted by varying the mix ratio of the sludge and the dust. In addition, after the by-products having a sludge form, a dust form, or a mixture form of sludge and dust are dried, moisture may be added to the by-products or non-dried by-products may be added to the dried by-products so as to adjust the moisture content of the by-product mixture.

Hereinafter, specific methods for adjusting the content of moisture and agglomeration processes will be described together with agglomeration devices.

If an agitation mixer such as an Eirich mixer is used for agglomerating the by-product mixture, it may be preferable that the total content of moisture in the by-product mixture be within the range of 10 wt % to 20 wt %. In an agglomeration process performed by an agitating and mixing method to form by-product compactions, the particle size and apparent moisture content of the by-product compactions are considerably affected by the total moisture content of sludge and dust to be agitated. If a by-product mixture having a moisture content within the above-mentioned range is agglomerated, when the by-product mixture including sludge and dust is agitated, lumps of the sludge may be pulverized, and moisture contained between particles of the sludge may be exposed to surrounding dust. Therefore, particles having a uniform size may be obtained.

In this case, the moisture content of the by-product mixture may be adjusted within the above-mentioned range by mixing the sludge and dust within a proper mix ratio range. For example, the moisture content of the by-product mixture may be decreased by adding more dust. The by-product mixture may be agglomerated by an agitating and mixing method, a pelletizing method, a briquetting method, or an extruding method according to the moisture content of the by-product mixture adjusted as described. By-product agglomeration devices will be described later in more detail. It may be necessary to dry by-products so as to additionally adjust the moisture content of the by-products according to the kind of by-product agglomeration device used to agglomerate the by-products.

Although the present disclosure is not limited to FINEX technology, most by-products discharged from molten iron making processes using FINEX technology are in the form of sludge having an excessive moisture content, and thus it is difficult to agglomerate the by-products by an agitating and mixing method. Even though dust having a relatively low moisture content is mixed with the by-products, there is a limit to adjusting the content of moisture to a proper value for agglomeration. In addition, even if a proper moisture content is obtained by adding more dust, since a large amount of sludge remains, there is a limit to recycling the by-products.

To address this, some of the by-products may be dried to remove moisture, and the dried by-products may be mixed with remaining non-dried by-products. That is, a by-product mixture of moisture-adjusted sludge and dust may be agitated to obtain by-product compactions. In addition, since the moisture content of dust is lower than a required moisture content, dust may be directly supplied to an agitation mixer to adjust the total moisture content.

For example, referring to FIG. 1, only a portion of sludge 20 containing moisture may be dried using a sludge dryer 240 to remove moisture, and then the dried sludge 20 may be fed into a by-product agglomeration device 230. In addition, dust 30 and sludge 20 containing moisture may be supplied to the by-product agglomeration device 230 respectively through supply pipes and may then be mixed with the dried sludge 20 so that the moisture content of whole by-products may be within a range of 10 wt % to 20 wt %. Thereafter, the by-products may be agglomerated by an agitating and mixing method.

The sludge dryer 240 for drying sludge 20 may be any kind of dryer, and examples of the sludge dryer 240 include a rotary kiln dryer, a fluidized bed dryer, and a belt dryer. A drying process may be performed using air, a hot blast stove, or a hot exhaust gas containing $CO_2$.

Preferably, an agitation mixer having a speed range of 200 rpm to 600 rpm, more preferably 350 rpm to 500 rpm, may be used. If sludge 20 and dust 30 are agitated within the speed range, the sludge 20 and dust 20 may be agglomerated.

A time period for agitation is not particularly limited, but may be within a range of 1 minute to 30 minutes. If the agitation time period is shorter than 1 minute, by-products may not be sufficiently agglomerated, and the strength of agglomerated by-products may be insufficient. On the other hand, if the agitation time period is more than 30 minutes, it may be uneconomical because additional effects are not obtained. For example, by-products may be agglomerated by agitating the by-products for an agitation time period of 1 minute to 20 minutes, 2 minutes to 10 minutes, or 2 minutes to 6 minutes.

If by-products are agglomerated using a pelletizer, it may be preferable that the moisture content of the by-products be within a range of 5 wt % to 10 wt %. FIG. 2 illustrates an exemplary case in which a pelletizer is used for agglomerating by-products.

Referring to FIG. 2, in a by-product agglomeration process, all sludge 20 is fed into a sludge dryer 240 to remove moisture from the sludge 20, and the dried sludge 20 is fed into a pelletizer, which is a by-product agglomeration device 235, while dust 30 containing moisture is supplied to the by-product agglomeration device 235 so as to mix the dust with the sludge 20. In this manner, the total moisture content of by-products may be adjusted within the above-mentioned range in the by-product agglomeration process.

In this case, as described above, since the moisture content of by-products is preferably 5 wt % to 10 wt % for the case of using a pelletizer, a predetermined amount of dust 30 may be supplied to the sludge dryer 240 together with sludge 20 for reducing the moisture content of the by-products, and the remaining dust 30 may be supplied to the by-product agglomeration device 235 for controlling the moisture content of the by-products.

Alternatively, in a by-product agglomeration process, a by-product agglomeration device 235 such as a briquetting device or an extruder may be used so as to agglomerate by-products while applying pressure to the by-products. In a case in which a briquetting device is used, it may be preferable that the moisture content of by-products be within a range of 10 wt % or less, more preferably within a lower range. In a case in which an extruder is used, it may be preferable that the moisture content of by-products be within a range of 10 wt % to 30 wt %.

Although the by-product agglomeration process using a briquetting device or an extruder has not been described in detail, those having ordinary skill in the art will easily adjust the moisture content of by-products in the by-product agglomeration process according to an agglomeration system used to perform the by-product agglomeration process, and will easily manufacture by-product compactions by referring to the descriptions given above with reference to FIGS. 1 and 2.

According to the present disclosure, by-product compactions may be made by agglomerating by-products using a mixer as described above or using any other by-product agglomeration device or method such as a mechanically extruding method, an extruding method using a mold, or a cohesion method using an inclined rotary fan or drum.

As illustrated in FIGS. 1 and 2, if necessary, in a by-product agglomeration process, an additive 60 such as water, a by-product having a different particle size, or a binder may be supplied to the agglomerate system to increase the strength of by-product compactions and the recovery rate of by-products, and another by-product, ore, or coal containing a large amount of iron or carbon may be supplied to the agglomeration device to increase the recycling efficiency of by-products.

In more detail, according to the present disclosure, when by-products are agglomerated, at least one selected from the group consisting of water, binders, and additives may be added to the by-products.

Water may be added to by-products for easily mixing the by-products and increasing cohesion between particles of the by-products. A binder may be added to by-products for improving the cohesive efficiency, room-temperature strength, and high-temperature strength of compactions formed of the by-products. An additive may be added to by-products for facilitating the reduction of iron oxides of the by-products or increasing the iron content of the by-products. Examples of the binder include an inorganic binder such as bentonite or water glass, and an organic binder such as starch or molasses.

Examples of the additive include coal or carbon-containing waste for facilitating the reduction of iron oxides, and ores or iron-containing wastes for increasing the content of iron. Alternatively, an additive such as limestone or white mica may be added to the by-products so as to facilitate the formation of slag in a later melting process in which the by-products are mixed with reduced iron.

According to the present disclosure, by-products containing carbon may facilitate the reduction of iron oxides included as main components in by-products of a melter gasifier, and thus reduced iron having a low reduction rate may also be recycled without causing problems such as an increase in fuel costs. In this case, if coal or waste containing carbon are additionally added, the reduction of iron oxides may be markedly improved, and thus the above-mentioned problems may be more surely prevented.

According to exemplary embodiments of the present disclosure, the moisture content of agglomerated by-products obtained through an agglomeration process may be varied within a range of 30 wt % or less according to process conditions. According to the present disclosure, by-product compactions 90 obtained as described above may be mixed with reduced iron in a reduced iron agglomeration process so as to produce reduced iron compactions.

In this case, if the by-product compactions 90 supplied to the reduced iron agglomeration process have a high moisture content, reduced iron may easily be re-oxidized by moisture contained in the by-product compactions 90, and the formability of reduced iron compactions may be lowered due to the generation of gas. For this reason, the by-product compactions 90 obtained in the by-product agglomeration process may be processed through a compaction drying process.

In the drying process, preferably, the by-product compactions 90 may be dried until the moisture content of the by-product compactions 90 is decreased to less than 5 wt %. If the moisture content of the by-product compactions 90 is 5 wt % or higher, the reduction rate of reduced iron may be undesirably lowered by 1% or more. Therefore, it may be preferable that the moisture content of the by-product compactions 90 be within a range of 5 wt % or less, and it may be more preferable if the by-product compactions 90 have a lower moisture content.

Any kind of compaction dryer 245 may be used to dry the by-product compactions 90. For example, the sludge dryer 240 used to dry sludge 20 may be used. However, since there is a possibility that the by-product compactions 90 may break into fine particles while being dried, a static dryer such as a belt dryer or a grate dryer may be used rather than using a dynamic dryer such as a rotary kiln dryer or a fluidized bed dryer so as to prevent the by-product compactions 90 from breaking into fine particles.

According to exemplary embodiments of the present disclosure, the by-product compactions 90 may be formed using by-products discharged in the form of sludge 20 and dust 30 from a molten iron making process. The by-product compactions produced as described above may be supplied to a fine reduced iron agglomeration process so as to produce reduced iron compactions by mixing the by-product compactions 90 with reduced iron.

To produce reduced iron compactions as described above, the by-product compactions 90 may be required to have a proper degree of strength and a proper particle size so that the by-product compactions 90 may not be broken when being transferred to a reduced iron agglomeration process. If the by-product compactions 90 have a strength of 0.5 kgf or greater based on the case in which the by-product compactions 90 have a spherical particle shape having a diameter of 5 mm, the by-product compactions 90 may be minimally broken when being transferred or stored. The strength of the by-product compactions 90 may preferably be 1 kgf or greater, and, more preferably, 2 kgf or greater.

Since the by-product compactions 90 are more effectively prevented from breaking in smaller pieces if the by-product compactions 90 have a higher degree of strength, the upper limit of the strength of the by-product compactions 90 is set to a particular value. However, if the by-product compactions have an excessively high degree of strength, it may be undesirable in terms of process economics or energy consumption. Thus, the strength of the by-product compactions 90 may be adjusted to be equal to or less than 20 kgf, 10 kgf, 7 kgf, 5 kgf, or 3 kgf.

In addition, the particle size of the by-product compactions 90 may preferably be within a range of 1 mm to 10 mm, but is not limited thereto. If the particle size of the by-product compactions 90 is less than 1 mm, poor formability may be caused when the by-product compactions 90 are mixed with reduced iron. Even if some of the by-product compactions 90 have a particle size less than 1 mm, if a fraction thereof is controlled to be less than 50 wt %, the formability of reduced iron compactions may be maintained. Conversely, if the particle size of the by-product compactions 90 is greater than 10 mm, it may be difficult to transfer the by-product compactions 90 and supply the by-product compactions 90 to a reduced iron agglomeration process.

Therefore, if necessary, the by-product compactions 90 may be sorted according to the particle size thereof so as to separate by-product compactions having a particle size within the above-mentioned range. To this end, the by-product compactions 90 may be sorted using a classifier 250.

After undergoing a sorting process using the classifier 250, by-product compactions 90 having a particle size within the above-mentioned range may be reused as described above in a process such as a reduced iron agglomeration process. In addition, fine by-product compactions 95 having a particle size smaller than the above-mentioned range may be supplied back to the by-product agglomeration device 230 or 235, and by-product compactions 90 having a particle size greater than the above-mentioned range may be broken into smaller pieces having a particle size within the above-mentioned range by using a crusher and may then be reused.

By-product compactions 90 produced as described above may be mixed with reduced iron in a reduced iron agglomeration process. In this manner, the by-product compactions 90 may be reused. As described above, by-products are agglomerated by mixing the by-products with reduced iron and are then supplied to a melting furnace, thereby preventing secondary problems such as the loss of the by-products or a decrease in the permeability of the by-products caused by breakage of the by-products when the by-products are recycled under a high-temperature atmosphere.

Generally, a coal-based molten iron making method includes a fluidizing reduction process in which fine iron ore is reduced, an agglomeration process in which the reduced fine iron ore is agglomerated into reduced iron compactions, and a melting process in which the reduced iron compactions are melted in a melting furnace. Among the processes, the fluidizing reduction process and the agglomeration process will now be schematically described with reference to FIGS. 3 and 4.

Figure 3:
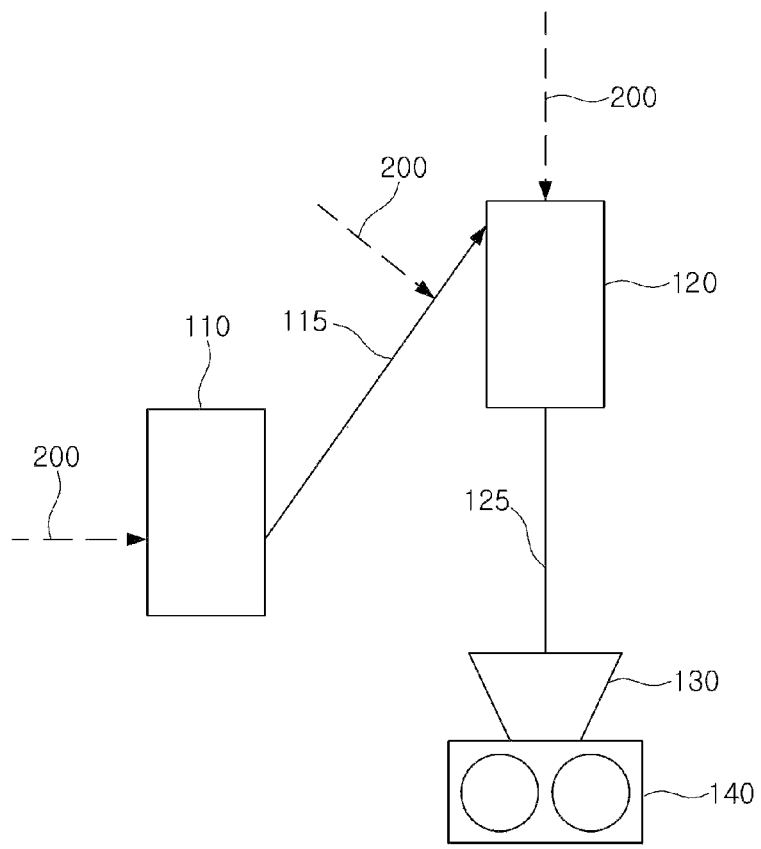
FIG. 3 is a schematic process diagram illustrating a reduced iron agglomeration process and points to which by-products discharged from a molten iron making process are supplied to the reduced iron agglomeration process, according to an exemplary embodiment of the present disclosure.
Figure 4:
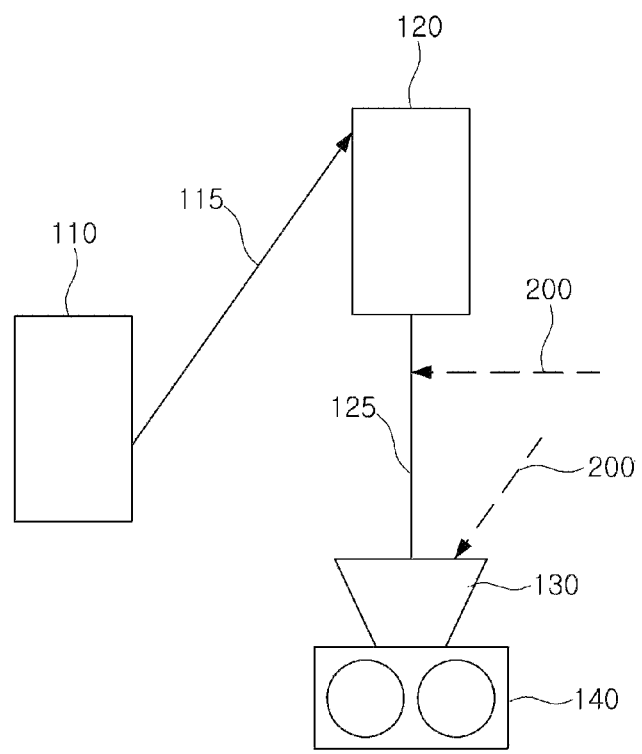
FIG. 4 is a schematic process diagram illustrating a reduced iron agglomeration process and points to which by-products discharged from a molten iron making process are supplied to the reduced iron agglomeration process, according to another exemplary embodiment of the present disclosure.

Referring to FIGS. 3 and 4, fine iron ore is reduced in a fluidized reduction furnace 110 to obtain reduced iron. The fluidized reduction process using the fluidized reduction furnace 110 is performed under a reducing atmosphere at a high temperature of 600° C., and thus the reduced iron has a high temperature of about 550° C. to 850° C. after passing through the fluidized reduction furnace 110. The reduced iron is discharged from the fluidized reduction furnace 110 through a reduction furnace discharge pipe 115 and is then supplied to a reduced iron tank 120, for example, by using a pressure difference.

Referring to FIG. 3, by-product compactions may be mixed with the reduced iron having a high temperature while making contact with the reduced iron for a sufficient time period, and thus the by-product compactions may be heated to a temperature similar to the temperature of the reduced iron, thereby improving formability in the reduced iron agglomeration process.

That is, as described above, the reduced iron to be mixed with the by-product compactions is produced at a high temperature of 600° C. or higher, and thus has a temperature within the range of 550° C. to 850° C. In this case, although the by-product compactions are rapidly heated to about 600° C. while being mixed with the reduced iron, since the by-product compactions are processed under high-temperature conditions and have a very low moisture content and a small particle size, the by-product compactions may not be subjected to or undergo physiochemical reactions, thermal impact, or breakage.

Therefore, the by-product compactions may be supplied to the fluidized reduction furnace 110 in which the reduced iron is produced, the reduction furnace discharge pipe 115 through which the reduced iron is discharged, or the reduced iron tank 120 in which the reduced iron is temporarily stored.

In addition, if the by-product compactions are supplied to the fluidized reduction furnace 110, the reduction furnace discharge pipe 115, or the reduced iron tank 120 as described above, the by-product compactions may be naturally mixed with the reduced iron because the reduced iron is being moved to the position to which the by-product compactions are supplied. In addition, the by-product compactions may be additionally mixed with the reduced iron while the reduced iron is transferred to the next equipment. Therefore, although an additional mixer for mixing the by-product compactions with the reduced iron is not used, the by-product compactions and the reduced iron may be uniformly mixed together. If the reduced iron and the by-product compactions are uniformly mixed with each other, reduced iron compactions may easily be formed.

Thus, a by-product supply pipe 200 may be installed so as to supply the by-product compactions to at least one selected from the group consisting of the fluidized reduction furnace 110, the reduction furnace discharge pipe 115, and the reduced iron tank 120.

The by-product compactions transferred as described above may be mixed with the reduced iron by a pneumatic method. For example, a high-pressure carrier gas may be blown to transfer the by-product compactions to the reduced iron by a steam of the carrier gas. The carrier gas may be any kind of gas. For example, compressed air or nitrogen gas may be used, or gases generated or discharged during a FINEX process may be used. A gas compressor 380 may be used to blow the carrier gas at a high pressure.

Alternatively, a storage bin may be installed at a halfway point, and a predetermined amount of the by-product compactions may be fed by gravity. In addition, a mechanical device such as a bucket elevator or a conveyer belt may be used for transferring and supplying the by-product compactions.

A mixture of by-product compactions and reduced iron may be supplied to an agglomeration process through a reduced iron supply pipe 125 by one or more of the above-described methods. In this case, if necessary, the mixture of by-product compactions and reduced iron may be first supplied to a forceful transfer tank 130, and then the mixture may be forcefully supplied from the forceful transfer tank 130 to a reduced iron agglomeration device 140 which agglomerates the mixture into reduced iron compactions.

The reduced iron compactions obtained as described above are finally inserted into a melter gasifier and melted. In this manner, the by-products may be reused in a molten iron making process.

Referring to FIG. 4, by-product compactions may be supplied from the reduced iron tank 120 in the middle of an agglomeration process. That is, the by-product compactions may be supplied to the reduced iron supply pipe 125 through which reduced iron is supplied from the reduced iron tank 120 to the forceful transfer tank 130. In addition, the by-product compactions may be supplied to the forceful transfer tank 130 used to forcefully supply reduced iron.

After the reduced iron is supplied to the forceful transfer tank 130 through the reduced iron pipe 125 as described above, the reduced iron may be processed through an agglomeration process. Therefore, the state of reduced iron supplied to the reduced iron pipe 125 and the forceful transfer tank 130 may be closely related with the formability of reduced iron compactions. Therefore, during an agglomerate process, the shape of reduced iron compactions, that is, the formability of reduced iron compactions may be observed to control the formability of the reduced iron compactions by varying the supply amount of by-product compactions. That is, the formability of reduced iron compactions may be improved by rapidly taking action according to process situations.

In addition, since by-product compactions are mixed with reduced iron in a reduced iron agglomeration process after the by-product compactions are minimally processed, the breakage of the by-product compactions may be minimized, and thus the formability of reduced iron compactions may be further improved.

According to the above-described embodiments, the temperature of reduced iron compactions is not sufficiently increased. However, the formability of reduced iron compactions may be improved by controlling the amount of by-product compactions, and thus problems that may be caused due to low-temperature conditions may be compensated for.

As described above, by-product compactions may be transferred to reduced iron by a pneumatic method using a carrier gas and may be mixed with the reduced iron. In this case, any kind of carrier gas may be used. For example, compressed air or nitrogen gas may be used, or gases generated or discharged during a FINEX process may be used.

Alternatively, a storage bin may be installed at a halfway point, and a predetermined amount of the by-product compactions may be fed by gravity. Alternatively, a mechanical device such as a bucket elevator or a conveyer belt may be used for transferring and supplying the by-product compactions.

A mixture of by-product compactions and reduced iron may be supplied to the forceful transfer tank 130 as described above and may then be supplied to the reduced iron agglomeration device 140 to form reduced iron compactions from the mixture.

The reduced iron compactions obtained as described above are finally inserted into a melter gasifier and melted. In this manner, by-products may be reused in a molten iron making process.

As long as by-product compactions are obtained using an existing by-product agglomeration device and are then mixed with reduced iron at the above-described positions, the present disclosure does not limit the kind or type of by-product compactions.

According to the present disclosure, the mix ratio of by-product compactions and reduced iron is not limited. However, the mix ratio of by-product compactions and reduced iron may be preferably greater than 0:10 but equal to or less than 9:1. Since reduced iron is generally in the form of particles of which surfaces are reduced as iron and is kept at a high temperature of about 600° C., even though the reduced iron is mixed with by-product compactions within the above-mentioned mix ratio range, agglomeration of the reduced iron may not be affected. The mix ratio of by-product compactions and reduced iron may be more preferably within a range of 1:9 to 4:6 by weight, and even more preferably within a range of 1:9 to 3:7 by weight or within a range of 1.5:8.5 to 2.5:7.5 by weight.

Figure 5:
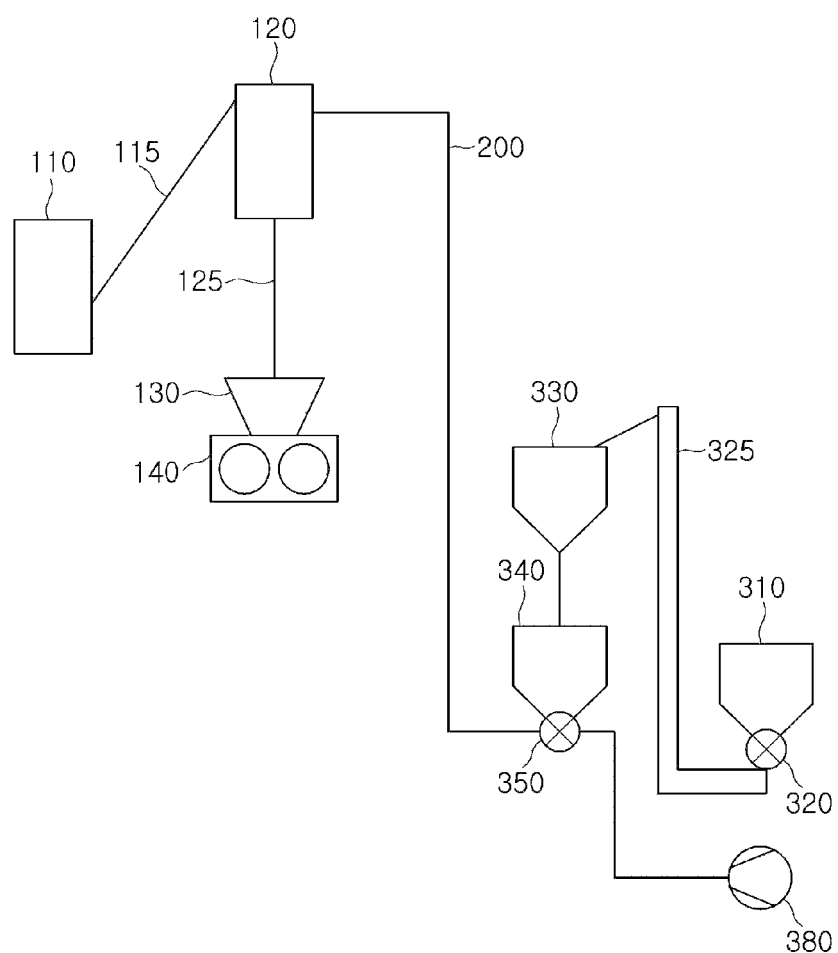
FIG. 5 is a schematic process diagram illustrating how by-products discharged from a molten iron making process are recycled in a reduced iron agglomeration process.
Figure 6:
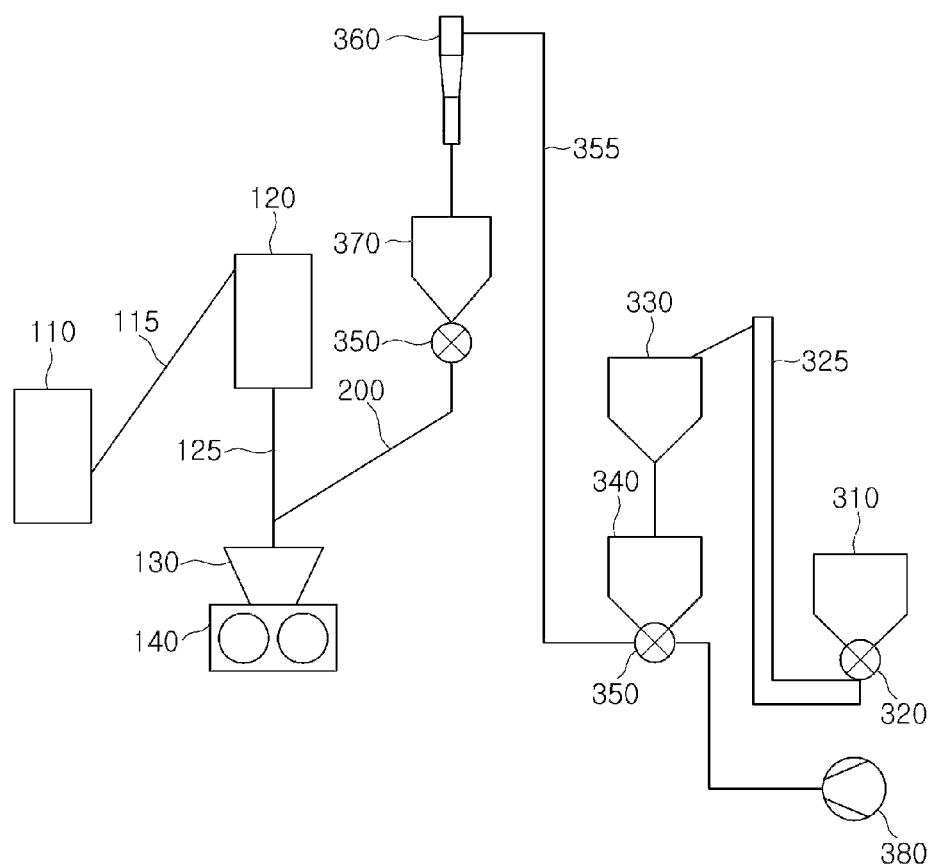
FIG. 6 is a schematic process diagram illustrating how compactions formed of by-products discharged from a molten iron making process are recycled in a reduced iron agglomeration process.

FIGS. 5 and 6 are schematic views illustrating a method of forming reduced iron compactions by supplying by-product compactions to a reduced iron agglomeration process.

Referring to FIG. 5, dust and sludge, solid substances of by-products discharged from a FINEX process, are mixed with each other and agglomerated to form by-product compactions, and the by-product compactions are supplied to a by-product tank 310 where the by-product compactions are mixed and then discharged through a screw feeder 320. The by-product compactions are transferred to a by-product intermediate tank 330 using a bucket elevator 325 and are then transferred to a by-product pneumatic transfer tank 340. Then, the by-product compactions are discharged from the by-product pneumatic transfer tank 340 through a rotary feeder 350 and are supplied to a reduced iron agglomeration process through a by-product supply pipe 200 by using a carrier gas blown from a gas compressor 380.

In the example shown in FIG. 5, the by-product compactions are pneumatically transferred to the reduced iron tank 120 in which reduced iron discharged from a fluidized reduction furnace 110 is stored for an agglomeration process. However, as described above, the by-product compactions may be supplied to the fluidized reduction furnace 110 or a reduction furnace discharge pipe 115 through which reduced iron discharged from the fluidized reduction furnace 110 is supplied to the reduced iron tank 120 by a discharge pressure difference.

Referring to FIG. 6, dust and sludge, solid substances of by-products discharged from a FINEX process, are mixed with each other and agglomerated to form by-product compactions, and the by-product compactions are supplied to a by-product tank 310 where the by-product compactions are mixed and then discharged through a screw feeder 320. The by-product compactions are transferred to a by-product intermediate tank 330 using a bucket elevator 325 and are then transferred to a by-product pneumatic transfer tank 340. Then, the by-product compactions are discharged from the by-product pneumatic transfer tank 340 through a rotary feeder 350 and are supplied to a reduced iron agglomeration process through a by-product supply pipe 200 by using a carrier gas blown from a gas compressor 380.

In this case, if the by-product compactions are supplied to the reduced iron agglomeration process together with the carrier gas, the reduced iron agglomeration process may be negatively affected. Therefore, the carrier gas may be separated from the by-product compactions by a gas-solid separation method using a cyclone separator 360, and then the by-product compactions may be temporarily stored in a by-product supply tank 370 and then supplied to the reduced iron agglomeration process through the by-product supply pipe 200 by using the rotary feeder 350. At this time, the by-product compactions may be supplied through the by-product supply pipe 200 by gravity or a mechanical transfer device.

In the example shown in FIG. 6, when reduced iron discharged from a fluidized reduction furnace 110 and stored in a reduced iron tank 120 is supplied to a forceful transfer tank 130 through a reduced iron supply pipe 125, by-product compactions are supplied to the reduced iron supply pipe 125. However, as described above, the by-product compactions may be supplied to the forceful transfer tank 130 or both the reduced iron supply pipe 125 and the forceful transfer tank 130.

Figure 7:
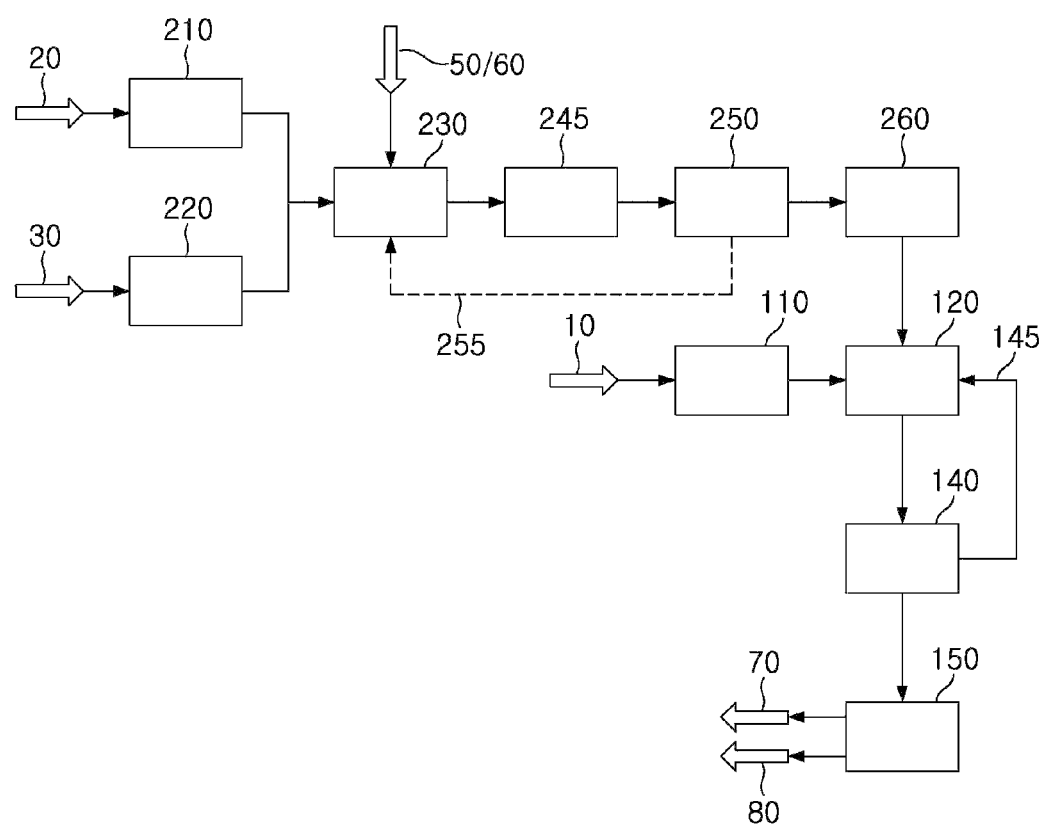
FIG. 7 is a process diagram illustrating a process for recycling by-products discharged from a molten iron making process, according to an exemplary embodiment of the present disclosure.

FIG. 7 illustrates an exemplary process of recycling by-products discharged from a molten iron making process, according to an exemplary embodiment of the present disclosure.

Referring to FIG. 7, sludge 20 and dust 30 generated from a molten iron making process are respectively stored in a sludge tank 210 and a dust tank 220. Then, the sludge 20 and the dust 30 are mixed with each other at a weight ratio of 1:1 and supplied to a by-product agglomeration device 230. Before an agglomeration process is performed in the by-product agglomeration device 230, a binder 50 and an additive 60 may be added to the mixture of the sludge 20 and dust 30 so as to improve cohesive efficiency and facilitate the reduction of iron.

The mixture of the sludge 20 and the dust 30 may then be agglomerated into spherical by-product compactions. Then, the by-product compactions may be optionally processed in a compaction dryer 245 to remove moisture therefrom. If the average particle size of the by-product compactions is not within a proper range or not suitable for recycling, the by-product compactions may be sorted using a classifier 250, and fine by-product compactions may be supplied back to the by-product agglomeration device 230 through a fine by-product recirculation pipe 255.

Thereafter, the by-product compactions are transferred to a storage/supply device 260 and then to a reduced iron tank 120 in which reduced iron obtained by reducing fine ore 10 in a fluidized reduction furnace 110 is stored. In the reduced iron tank 120, the by-product compactions and the reduced iron are mixed with each other at a predetermined ratio.

Thereafter, a mixture of the by-product compactions and the reduced iron is transferred to a reduced iron agglomeration device 140 and is agglomerated using the reduced iron agglomeration device 140. At this time, fine particles of the reduced iron generated when the mixture is agglomerated may be transferred back to the reduced iron tank 120 through a fine reduced iron recirculation pipe 145. Then, the rest of the agglomerated mixture is transferred to a melter gasifier 150 and melted, and slag 70 and molten iron 80 are discharged from the melter gasifier 150.

As described above, if the method and system of the present disclosure are used, compactions formed of by-products discharged from a molten iron making process may be recycled without the loss of the by-products or a decrease in the permeability of the compactions caused by breakage of the compactions.

MODE FOR INVENTION

Examples

Hereinafter, the present disclosure will be described more specifically with reference to examples. The following examples are for illustrative purposes only and are not intended to limit the scope of the present invention.

Example 1

In Example 1, sludge and dust generated from a FINEX process for making molten iron (molten iron making FINEX process) were agglomerated through a by-product agglomeration process shown in FIG. 1.

In detail, sludge 20 having a moisture content of about 40 wt % and dust 30 having a moisture content of about 15 wt %, which were by-products discharged from a molten iron making FINEX process, were prepared at a weight ratio of 7:3.

Half the sludge 20 was supplied to the sludge dryer (rotary kiln furnace) 240 in which the half of the sludge 20 was heated to remove moisture.

Then, the half of the sludge 20 which was heat-dried was supplied to the by-product agglomeration device 230 being an agitation mixer, and the other half of the sludge 20 which was not dried was directly supplied to the agitation mixture to mix the non-dried half of the sludge 20 with the dried half of the sludge 20. In addition, the dust 30 was supplied to the agitation mixer.

The by-products (the sludge 20 and the dust 30) mixed in the agitation mixer had a moisture content of about 18 wt % based on the total weight of the by-products.

The agitation mixer was continuously agitated at a speed of 400 rpm for about 4 minutes to agglomerate the by-products as by-product compactions.

Thereafter, the by-product compactions were transferred from the agitation mixer to the compaction dryer 245 in which the by-product compactions were fully dried, and the dried by-product compactions were sorted using the classifier 250 to collect by-product compactions 90 having a particle size within a range of 1 mm to 10 mm.

The weight of the by-product compactions 90 was measured to be about 85% of the weight of the by-products supplied to the agitation mixer. In addition, the strength of the by-product compactions 90 was about 1 kgf.

Example 2

In Example 2, sludge and dust generated from a molten iron making FINEX process were agglomerated through a by-product agglomeration process shown in FIG. 2.

The same by-products as the by-products used in Example 1 were prepared from a molten iron making FINEX process.

All sludge 20 was supplied to the sludge dryer (rotary kiln furnace) 240, and the sludge 20 was heated in the sludge dryer 240 to remove moisture.

The dried sludge 20 was supplied to the agglomeration device 235 being a pelletizer, and dust 30 was also supplied to the pelletizer. The by-products (the sludge 20 and the dust 30) mixed in the pelletizer had a moisture content of about 5 wt % based on the total weight of the by-products.

Water was supplied to the pelletizer to adjust the moisture content of the by-products to be 8 wt %, and then the by-products were agglomerated as pellets using the pelletizer.

Thereafter, the pellets were transferred from the pelletizer to the compaction dryer 245 in which the pellets were fully dried, and the dried pellets were sorted using the classifier 250 to collect pellets having a particle size within the range of 1 mm to 10 mm.

The weight of the pellets (by-product compactions) was measured to be about 95% of the weight of the by-products supplied to the pelletizer. In addition, the strength of the by-product compactions was about 1.5 kgf.

Example 3

Equal weights of sludge and dust generated from a molten iron making FINEX process and having the compositions shown in Table 1 were mixed with each other for about 3 minutes using an Eirich mixer. In this manner, pellets having an average particle size of 2 mm were obtained.

The pellets were dried in an oven dryer at 105° C. for 24 hours to fully remove moisture from the pellets.

Thereafter, the pellets were mixed with reduced iron at a weight ratio of 2:8 to form a mixture sample, and 100 g of the mixture sample was agglomerated at 600° C. while applying a pressure of 150 MPa to the mixture sample to form disk-shaped compactions. Then, the compressive strength of the disk-shaped compactions (sample) was measured.

After excluding abnormal values, 10 measured values were averaged. The average compressive strength is shown in Table 2.

Comparative Example 1

The same reduced iron as that used in Example 3 was agglomerated as disk-shaped compactions by the same method as that used in Example 3, except that by-products were not mixed with the reduced iron, and the compressive strength of the disk-shaped compactions (sample) was measured. The measured compressive strength is shown in Table 2.

TABLE 2

| Sample | Comparative Example 1 | Example 3 |
|---|---|---|
| Compressive Strength (kg/cm$^2$) | 575 | 682 |

Referring to Table 2, the compressive strength of the compactions prepared by mixing pellets (by-products) and reduced iron with each other in Example 3 is greater than the compressive strength of the compactions prepared only using reduced iron in Comparative Example 1. Therefore, when the compactions formed by mixing by-products and reduced iron are inserted into a melting furnace, problems such as breakage of the compactions may not be caused.

Example 4

Fine iron ore was reduced at about 750° C. in the fluidized reduction furnace 110 to obtain reduced iron. Then, the reduced iron was discharged from the fluidized reduction furnace 110 through the reduction furnace discharge pipe 115 and was supplied to the reduced iron tank 120 by a pressure difference.

Sludge and dust discharged from a molten iron making FINEX process and having the compositions shown in Table 1 were mixed together and agglomerated at a weight ratio of 1:1 to obtain by-product compactions, and the by-product compactions were stored in the by-product tank 310 shown in FIG. 5.

Thereafter, the by-product compactions were discharged from the by-product tank 310 using the screw feeder 320 and transferred to the by-product intermediate tank 330 using the bucket elevator 325.

Next, the by-product compactions were transferred to the by-product pneumatic transfer tank 340 and were discharged a predetermined amount at a time to the by-product supply pipe 200 connected to the reduced iron tank 120 by using the rotary feeder 350. High-pressure nitrogen gas was blown to the reduced iron tank 120 through the by-product supply pipe 200 by the gas compressor 380.

The by-product compactions discharged to the by-product supply pipe 200 were transferred to the reduced iron tank 120 by a stream of the nitrogen gas. At that time, the by-product compactions were transferred to the reduced iron tank 120 such that the content of the by-product compactions in a mixture of the by-product compactions and the reduced iron might be about 7 wt % based on the total weight of the mixture.

Thereafter, the mixture of the by-product compactions and the reduced iron was compressed using the reduced iron agglomeration device 140 to form compactions.

The density and hot strength of the compactions were compared with the density and hot strength of hot compacted iron (HCI) formed of only reduced iron, and comparison results are shown in Table 3.

After, a drum test was performed on the compactions and the HCI at a temperature of 1000° C. and a speed of 30 rmp, and the percentage (%) of particles having a size of 2.8 mm or less (fine particle percentage) that might decrease the permeability of the compactions and the HCI were measured as a factor of the hot strength of the compactions and the HCI.

The percentage of particles having a size of 2.8 mm or less (fine particle percentage) of the HCI was about 10% before the drum test, and based on this fine particle percentage, the variations of hot strength of the compactions and the HCI could be estimated after the drum test. A large variation of the fine particle percentage indicates a low degree of hot strength.

TABLE 3

|  | HCI | Example 4 |
|---|---|---|
| Density (g/cm$^3$) | 3.73 | 3.57 |
| Fine Particle Percentage (%) | 15 | 17 |

Referring to Table 3, although the compactions prepared according to the present disclosure had the by-product compactions as impurities, the increase of the fine particle percentage of the compactions was less than the increase of the fine particle percentage of the HCI formed of only reduced iron. That is, the hot strength of the compactions of the present disclosure was substantially not decreased when compared with the HCI.

Therefore, although the compactions including the by-product compactions are inserted into a melting furnace, by-products may not break, and thus by-products may be recycled without problems.

Example 5

Fine iron ore was reduced at about 750° C. in the fluidized reduction furnace 110 to obtain reduced iron. Then, the reduced iron was discharged from the fluidized reduction furnace 110 through the reduction furnace discharge pipe 115 and was supplied to the reduced iron tank 120 by a pressure difference.

Sludge and dust discharged from a molten iron making FINEX process and having the compositions shown in Table 1 were mixed together and agglomerated at a weight ratio of 1:1 to obtain by-product compactions, and the by-product compactions were stored in the by-product tank 310 as shown in FIG. 6.

Thereafter, the by-product compactions were discharged from the by-product tank 310 using the screw feeder 320 and transferred to the by-product intermediate tank 330 using the bucket elevator 325.

Next, the by-product compactions were transferred to the by-product pneumatic transfer tank 340, and the by-product compactions were discharged to the gas supply pipe 355 through the rotary feeder 350. At the same time, high-pressure nitrogen gas was supplied from the gas compressor 380.

The by-product compactions transferred through the gas supply pipe 355 using the nitrogen gas was supplied to the cyclone separator 360 to separate the nitrogen gas from the by-product compactions, and then the by-product compactions were supplied by gravity to the reduced iron supply pipe 125 through the by-product supply pipe 200 connected to the reduced iron supply pipe 125. At that time, the by-product compactions were supplied such that the content of the by-product compactions in a mixture of the by-product compactions and reduced iron might be about 7 wt % based on the total weight of the mixture.

Thereafter, the mixture of the by-product compactions and the reduced iron was compressed using the reduced iron agglomeration device 140 to form compactions. The hot strength of the compactions was measured as shown in Table 4.

The density and hot strength of the compactions were compared with the density and hot strength of HCl formed of only reduced iron, and results of comparison are shown in Table 4.

After, a drum test was performed on the compactions and the HCl at a temperature of 1000° C. and a speed of 30 rmp, and the percentage (%) of particles having a size of 2.8 mm or less (fine particle percentage) that might decrease the permeability of the compactions and the HCl was measured as a factor of the hot strength of the compactions and the HCl.

The percentage of particles having a size of 2.8 mm or less (fine particle percentage) of the HCl was about 10% before the drum test, and based on this fine particle percentage, the variations of hot strength of the compactions and the HCl could be estimated after the drum test. A large variation of the fine particle percentage indicates a low degree of hot strength.

TABLE 4

|  | HCl | Example 5 |
|---|---|---|
| Density (g/cm$^3$) | 3.73 | 3.50 |
| Fine particle percentage (%) | 15 | 18 |

Referring to Table 4, although the compactions prepared according to the present disclosure had the by-product compactions as impurities, the increase of the fine particle percentage of the compactions of the present disclosure was less than the increase of the fine particle percentage of the HCl formed of only reduced iron. That is, the hot strength of the compactions of the present disclosure was substantially not decreased when compared with the HCl.

Therefore, although the compactions including the by-product compactions are inserted into a melting furnace, by-products may not break, and thus by-products may be recycled without problems.

The invention claimed is:

1. A method for recycling iron-containing by-products discharged from a molten iron making process in the form of dust and sludge containing moisture, the method comprising:
   agglomerating by-products discharged from a molten iron making process to form by-product compactions, wherein the by-products consist of a sludge and a dust both containing iron;
   reducing iron ore to form a reduced iron;
   mixing the by-product compactions and the reduced iron to form a mixture of the by-product compactions and the reduced iron; and
   agglomerating the mixture to form a mixture compaction.

2. The method of claim 1, wherein the agglomerating of the by-products comprises:
   drying the sludge, or a portion of the sludge to form a dried sludge;
   preparing a by-product mixture having a predetermined moisture content by mixing the dried sludge with the dust, or with the dust and remaining sludge;
   agglomerating the by-product mixture to form agglomerated by-products; and
   drying the agglomerated by-products to form the by-product compactions.

3. The method of claim 2, wherein the drying of the sludge, or the portion of the sludge comprises: adding the dust to the sludge, or the portion of the sludge.

4. The method of claim 2, wherein the predetermined moisture content is 30 wt % or less.

5. The method of claim 2, wherein after the drying of the agglomerated by-products, the agglomerating of the by-products further comprises: sorting the by-product compactions to obtain by-product compactions having a particle size of 1 mm to 10 mm.

6. The method of claim 1, wherein the by-product compactions have a moisture content of 5 wt % or less.

7. The method of claim 1, wherein the by-product compactions and the reduced iron are mixed at a weight ratio greater than 0:10 but equal to or less than 9:1.

8. The method of claim 1, wherein the iron ore is reduced in a reduction furnace under a reducing atmosphere.

9. The method of claim 1, wherein the reducing of the iron ore comprises:
   reducing the iron ore in a fluidized reduction furnace under a reducing atmosphere so as to form the reduced iron;
   discharging the reduced iron through a reduction furnace discharge pipe;
   storing the reduced iron in a reduced iron tank;
   supplying the reduced iron from the reduced iron tank to a forceful transfer tank through a reduced iron supply pipe; and
   supplying the reduced iron to an agglomeration device.

10. The method of claim 9, wherein the by-product compactions are supplied to one or more of the fluidized reduction furnace, the reduction furnace discharge pipe, and the reduced iron tank.

11. The method of claim 9, wherein the by-product compactions are supplied to one or both of the reduced iron supply pipe and the forceful transfer tank.

* * * * *